US011689432B1

(12) United States Patent
Bhattacharjee et al.

(10) Patent No.: US 11,689,432 B1
(45) Date of Patent: Jun. 27, 2023

(54) FEEDBACK PRIORITIZATION SYSTEM

(71) Applicant: Amazon Technologies, Inc., Seattle, WA (US)

(72) Inventors: Kasturi Bhattacharjee, Sunnyvale, CA (US); Rashmi Gangadharaiah, San Jose, CA (US); Sharon Shapira, Sammamish, WA (US); Ankit Kapoor, Seattle, WA (US); Tony Chun Tung Ng, San Ramon, CA (US); Senthil Chock Chidambaram, Folsom, CA (US); Deepak Seetharam Nadig, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/657,437

(22) Filed: Mar. 31, 2022

(51) Int. Cl.
*H04L 41/5061* (2022.01)
*H04L 41/50* (2022.01)
*H04L 41/5074* (2022.01)

(52) U.S. Cl.
CPC ...... *H04L 41/5064* (2013.01); *H04L 41/5032* (2013.01); *H04L 41/5074* (2013.01)

(58) Field of Classification Search
CPC ............. H04L 41/5064; H04L 41/5032; H04L 41/5074
USPC ........................................................ 709/223
See application file for complete search history.

(56) References Cited

U.S. PATENT DOCUMENTS

| | | | | |
|---|---|---|---|---|
| 7,552,365 B1* | 6/2009 | Marsh | ................ | G06F 11/0751 |
| | | | | 707/999.005 |
| 10,609,570 B2* | 3/2020 | Martone | ................ | H04L 43/12 |
| 10,861,453 B1* | 12/2020 | Chadha | .............. | G10L 15/1815 |
| 11,270,329 B2* | 3/2022 | Jain | ...................... | G06Q 20/322 |
| 11,526,819 B1* | 12/2022 | Lakshmipathy | .... | G06Q 10/0635 |
| 2003/0158765 A1* | 8/2003 | Ngi | .................. | G06Q 10/06375 |
| | | | | 705/7.22 |
| 2013/0059534 A1* | 3/2013 | Sobalvarro | ............ | H04W 4/50 |
| | | | | 455/41.1 |
| 2013/0138533 A1* | 5/2013 | Vartanian | ............... | G06Q 30/06 |
| | | | | 705/26.35 |
| 2015/0149485 A1* | 5/2015 | Casserly | .................. | G06N 5/04 |
| | | | | 707/748 |
| 2015/0170228 A1* | 6/2015 | Wheeler | ............ | G06Q 30/0282 |
| | | | | 705/319 |
| 2015/0356579 A1* | 12/2015 | Brondstetter | ...... | G06Q 30/0203 |
| | | | | 705/7.32 |
| 2016/0036973 A1* | 2/2016 | Harasimiuk | ........ | H04M 3/5191 |
| | | | | 379/265.13 |
| 2016/0335345 A1* | 11/2016 | Wang | ..................... | G06F 16/367 |
| 2017/0244735 A1* | 8/2017 | Visbal | ................. | G06F 16/9038 |
| 2020/0151752 A1* | 5/2020 | Kazlou | ............. | G06Q 30/0282 |
| 2020/0159648 A1* | 5/2020 | Ghare | ................... | G06F 9/4411 |
| 2020/0401932 A1* | 12/2020 | Kumar | ................. | G06F 16/953 |
| 2022/0067800 A1* | 3/2022 | Carbonell | .......... | G06Q 30/0282 |
| 2022/0207606 A1* | 6/2022 | Dickie | ..................... | G06N 5/04 |

(Continued)

*Primary Examiner* — Tauqir Hussain
(74) *Attorney, Agent, or Firm* — Knobbe Martens Olson & Bear LLP

(57) ABSTRACT

The present disclosure generally relates to a feedback processing service that can receive customer input, as customer feedback corresponds to a service context. The feedback processing service aggregates semantically similar feedback as a cluster. Then, the feedback processing service can prioritize each of the clusters by ranking each of the clusters.

33 Claims, 4 Drawing Sheets

(56) References Cited

U.S. PATENT DOCUMENTS

2022/0377582 A1* 11/2022 Sakamoto ............. H04L 41/149
2023/0037124 A1* 2/2023 Mengwasser ......... H04W 24/06

* cited by examiner

FEEDBACK PRIORITIZATION SYSTEM

BACKGROUND

Generally described, computing devices and communication networks can be utilized to exchange data or information. In a common application, a computing device can request content from another computing device via the communication network. For example, a user having access to a computing device can utilize a software application to request content or access network-hosed applications/functionality from a computing device via the network (e.g., the Internet). In such embodiments, the user's computing device can be referred to as a client computing device, and the network-based computing device can be referred to as a service provider. Additionally, the client computing device can collect or generate information and provide the collected information to a network-based computing device for further processing or analysis.

In some embodiments, a network service provider can provide computing device resources, such as virtual machine instances, that are configurable to execute tasks based on network service provider customers. In some scenarios, it may be possible that one or more network-based resources prioritize each of the customer inputs, where the customer inputs can be utilized as customer feedback. In one example, after receiving a plurality of customer feedback, semantically similar customer feedback can be aggregated into a cluster. Each cluster can be prioritized by measuring an inertia score of each of the clusters.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
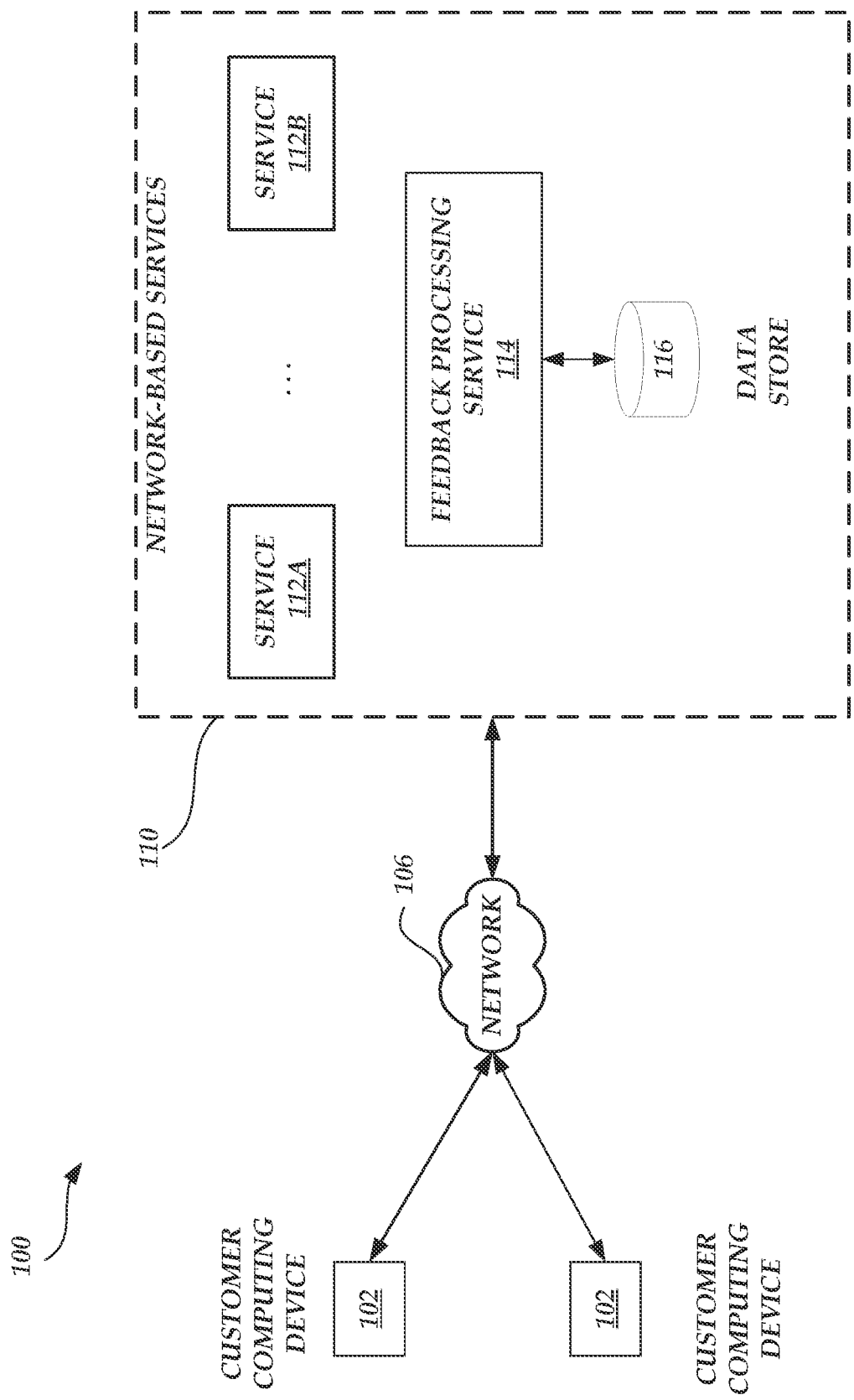
FIG. 1 is a block diagram depicting an illustrative system for implementing a network service for implementing a feedback management service according to one or more aspects of the present application.

Aspects of the present disclosure relate to systems and methods for aggregating and prioritizing customer feedback. Illustratively, customer feedback can generically including any type of input, instruction or control provided by a third-party to a service provided, including but not limited to feedback, suggestions, customer support, claims, and the like. For purposes of brevity, all such input will be generally described as "customer feedback" without any limitation as to the type of input or nature of the input. More specifically, one or more aspects of the present application can correspond to aggregating semantically similar feedback into a cluster and prioritizing each cluster by measuring an inertia score of each cluster. Illustratively, the network service can implement a network-based feedback processing service. In some aspects, the feedback processing service can be either a real-time or a batch-oriented. In one aspect, the customer feedback processing service can obtain customer inputs from a plurality of customers. The customer inputs can be feedback and collected from multiple customer computing devices. In one aspect, the set of customer feedback is vectorized to form a set of vectorized customer feedback. In this aspect, vectorizing the set of customer feedback may include generating an individual numerical vector for each customer feedback. Obtaining the customer feedback aspect can be implemented as a stand-alone service that stores the customer inputs. Alternatively, obtaining the customer feedback aspect can be integrated as part of the feedback processing service.

In one aspect, the feedback processing service can process the obtained customer feedback to aggregate semantically similar feedback. More specifically, the customer feedback processing service can aggregate semantically similar feedback by clustering each aggregated feedback. Illustratively, the feedback processing service can aggregate the semantically similar feedbacks as a cluster by capturing each customer feedback. As a result of the aggregation, multiple clusters can be created, and each cluster can include aggregated semantically similar feedback. In one aspect, the feedback processing service vectorizes the obtained customer feedback using a SentenceBERT embedding ("SBERT"). In one aspect, semantically similar feedbacks are clustered using k-means clustering on the SBERT embeddings. In another aspect, the feedback processing service may cluster semantically similar feedbacks using DNN-based clustering such as Deep Embedded Clustering ("DEC").

In one aspect, each of the clusters can include a representative theme. More specifically, the feedback processing service can identify a representative theme. The representative theme can be a representative vectorized customer feedback. Illustratively, the feedback processing service determines a representative theme based on each cluster's centroid. In one aspect, the representative theme of a cluster can be determined by a noun phrase extraction. For example, nouns, proper nouns, and noun phrases can be extracted from one or more representative feedbacks from a cluster, and all pronouns that occur at the beginning or end of noun phrases can be removed. In the example, dependency parsing can extract all verbs that are nominal subject or object of the nouns, proper nouns, and noun phrases. In another example, each of the representative feedbacks can be constructed in the form of <verb, noun>.

In further aspects of the present application, the feedback processing service can prioritize each of the clusters. More specifically, the feedback processing service can filter the clusters and rank the remaining clusters. In one aspect, the remaining clusters can be ranked by measuring at least one following criteria; an inertia score of each cluster, the number of customers of each cluster, or a number of received customer feedback of each cluster. Other criteria to rank the remaining clusters may include (1) size of the customer (e.g., by revenue, opportunity per individual customer), (2) age of the customer (e.g., measured time per individual customer), (3) time interval between the feedback items (several customer feedback in a week can be ranked higher than the same number of customer feedback over a longer period of time). For example, if two or more clusters have the same number of feedback from the same number of customers, the clusters having feedback from customers of larger sizes will be ranked higher. In the example, the cluster having feedback in a shorter time interval (e.g., in a day) can also have a higher ranking than other clusters having feedback in a longer interval (e.g., over a year). These criteria are merely examples, and the present disclosure is not limited thereto, and the criteria can be determined based on a particular application. In this aspect, two or more criteria can be combined to rank the remaining clusters. Illustratively, the feedback processing service can filter the clusters based on each cluster's customer inputs or based on at least one of the criteria. Each cluster that does not have a minimal vectorized customer input threshold can be filtered. For example, a cluster that does not have 10 feedbacks proximity to the centroid of the cluster can be filtered. In another example, a cluster that does not meet a threshold of one or more of the criteria can be filtered. In one aspect, the feedback processing service can measure at least one of the inertia scores, the number of customers, or the number of feedbacks of each cluster. The inertia score can represent the coherence of each cluster. In one aspect, the feedback processing service can rank each of the clusters in ascending order of the inertia score. In another aspect, the feedback processing service can measure at least two of the criteria and rank the clusters by combining the measured criteria.

Generally, traditional aggregating and prioritizing customer feedback presents significant technical challenges for network-based service providers. To utilize the customer feedback and prioritize the customer feedback, traditionally, each customer feedback can be manually processed or otherwise limited in a manner that requires specific labeling to be processed semi-automatically. In one aspect, aggregating and prioritizing customer inputs are time-consuming and laborious for a network service provider. In certain scenarios, a network-based service provider receives a vast amount of customer inputs as feedback on products and services provided by the provider. Customer feedback is useful and important to the provider because the feedbacks are a rich resource to improve the quality of the provider's products and services. However, the customer feedback is unstructured and voluminous and thus remains underutilized.

To address at least a portion of the above-described deficiencies, one or more aspects of the present application correspond to systems and methods for the feedback processing service without requiring the customer input labels from a user. The feedback processing service aggregates semantically similar customer feedback. Each aggregated customer feedback can be a cluster. The cluster can include or can be represented with a representative theme. The representative theme of the cluster can be identified by vectorizing the cluster. For example, after vectorization, a centroid of the cluster can be a representative theme of the cluster. The feedback processing service can rank each of the clusters by utilizing the vectorized clusters' ranking and provide the result to the network service provider.

Although aspects of the present application will be described with regard to illustrative network components, interactions, and routines, one skilled in the relevant art will appreciate that one or more aspects of the present application may be implemented in accordance with various environments, system architectures, computing device architectures, and the like. Similarly, reference to specific devices, such as command and control nodes, can be considered to be general references and not intended to provide additional meaning or configurations for individual computing devices. Additionally, the examples are intended to be illustrative in nature and should not be construed as limiting.

FIG. 1 depicts a block diagram of an embodiment of the system 100. The system 100 can comprise a network, the network connecting a number of computing devices 102 and a network-based 110 via a communication network 106. Illustratively, the various aspects associated with network-based 110 can be implemented as one or more components that are associated with one or more functions or services. The components may correspond to software modules implemented by one or more computing devices, which may be a separate stand-alone computing devise. Accordingly, the components of network-based 110 should be considered as a logical representation of the service, not requiring any specific implementation on one or more computing devices.

The network 106 depicted in FIG. 1 connects the devices and modules of the system. The network can connect any number of devices. In some embodiments, a network service provider provides network-based services or products to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provides those services. In some embodiments, the network may be a content delivery network.

The computing devices 102 in FIG. 1 can connect to the network and network-based service 110. Solely for purposes of illustration, computing devices 102 that will access one or more services 112 maintained by network-based service 110. The computing devices 102 can be configured to transmit feedback to network-based 110 to access one or more network-based services using a communication protocol. The computing devices 102 are configured to have at least one processor. That processor can be in communication with a memory for maintaining computer-executable instructions. The computing devices 102 may be physical or virtual. The computing devices may be mobile devices, personal computers, servers, or other types of devices. The computing devices 102 may have a display and input devices through which a user can interact with the user-interface component.

Illustratively, the network-based 110 can include a plurality of network-based services that can provide functionality responsive to customer inputs transmitted by the client computing devices 102, such as in the implementation of a set of feedbacks. As illustrated in FIG. 1, the network-based 110 includes a set of network-based feedback services 112A, 112B, etc. Illustratively, the network-based feedback services 112A, 112B represent different logical or geographic regions provided by the network-based service 110. Additionally, although a set of feedback services 112A-112B are generally referred to as "feedback services," such designation does not require that all such services are directly accessible via a network, such as a network 106. For example, one or more "feedback" services 112 may correspond to processes executed by the network-based 110 in a computing environment where external access to the network 106 is not configured. By way of illustration, data encryption or data management service that does not provide any external network access may be executed by the network-based 110 to manage data maintained by another service, such as a hosting data service.

The network-based 110 further includes a feedback processing service 114 that represents the various functions to receiving customer inputs and aggregating the customer inputs and prioritizing the aggregated customer inputs, such as one or more of the network-based feedback services 112A, 112B. In some embodiments, the feedback processing service can be either a real-time or a batch-oriented. The feedback processing service 114 can be further associated with a customer input data store 116 related to correlation information for identifying or collecting customer feedback. Additionally, customer input data store 116 can include verification and validation information utilized by the feedback processing service 114. Illustrative components of the feedback processing service 114 will be illustratively described with regard to FIG. 2, although the functionality attributed to the feedback processing service 114 may be implemented in any one of a number of computing devices. Similarly, the customer input data store 116 may be implemented in any computing device to maintain data in a centralized or distributed manner.

Figure 2:
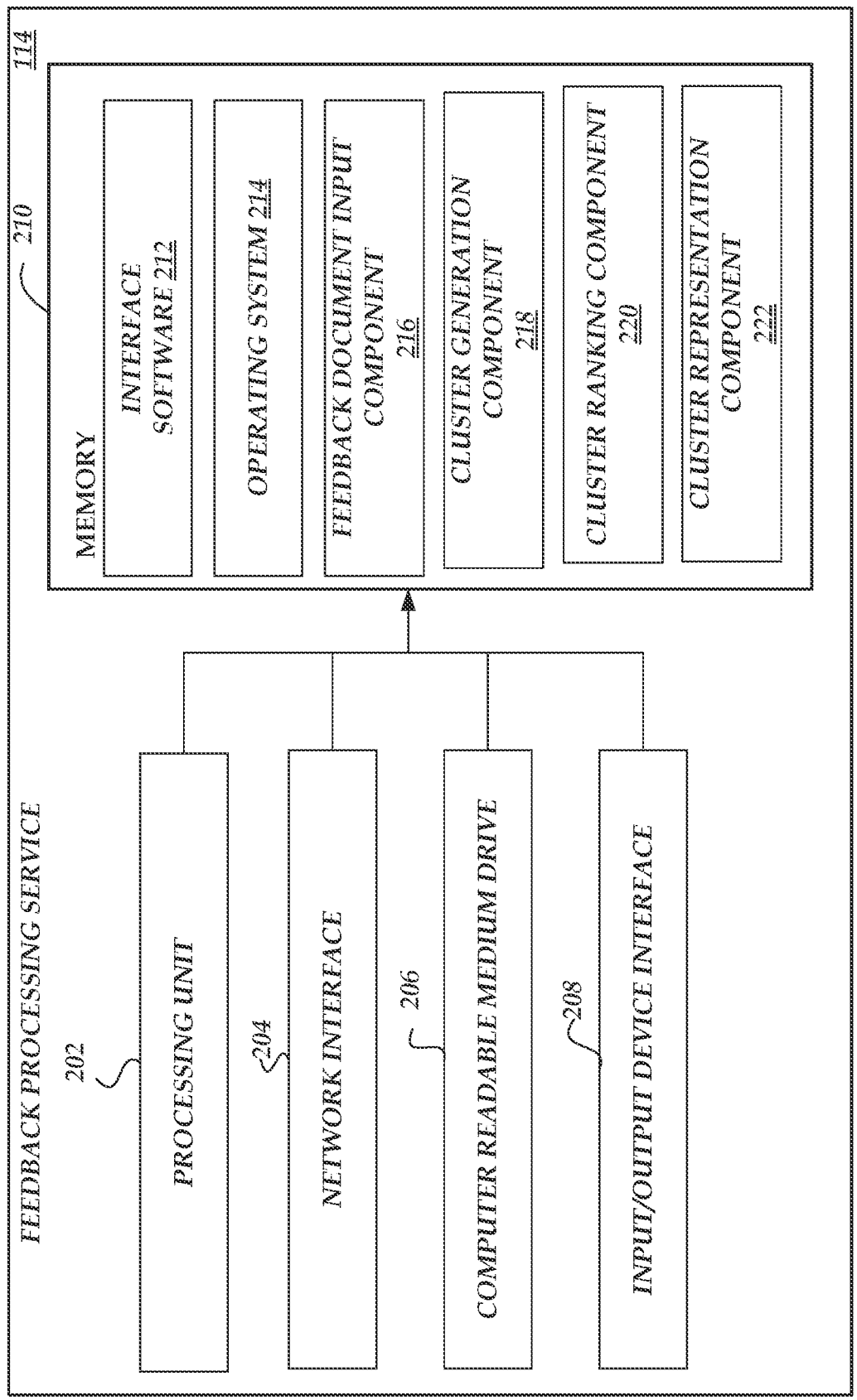
FIG. 2 is a block diagram illustrative of components of a feedback management service in accordance with aspects of the present application.

FIG. 2 depicts one embodiment of an architecture of an illustrative server for implementing the feedback processing service 114 as described. The general architecture of the feedback processing service 114 depicted in FIG. 2 includes an arrangement of computer hardware and software components that may be used to implement aspects of the present disclosure. As previously discussed, the components of the feedback processing service 114 may include physical hardware components, one or more virtualized components, or a combination thereof. Additionally, the components of the feedback processing service 114 or the functionality attributed by the interface component service may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the feedback processing service 114.

As illustrated, the feedback processing service 114 includes a processing unit 202, a network interface 204, a computer-readable medium drive 206, and an input/output device interface 208, all of which may communicate with one another by way of a communication bus. The components of the feedback processing service 114 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208. In some embodiments, the feedback processing service 114 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the feedback processing service 114. The memory 210 may further include computer program instructions and other information for implementing aspects of the present disclosure. For example, in one embodiment, the memory 210 includes a feedback document input component 216 that is configured to obtain customer feedback provided by a plurality of customers. The memory 210 further includes a cluster generation component 218 that is configured to aggregate semantically similar feedback as a cluster, as described herein. The memory 210 further includes a cluster representation component 220 that is configured to identify a representative theme of the cluster as described herein. The memory 210 further includes a cluster ranking control component 222 that is configured to implement one or more prioritization processes for a set of generated clusters, as described herein. As described previously, the components in memory 210 represent various functions that can be implemented by the feedback processing service 114. Such components may be executed in separate computing devices (virtual or physical computing environments).

Figure 3:
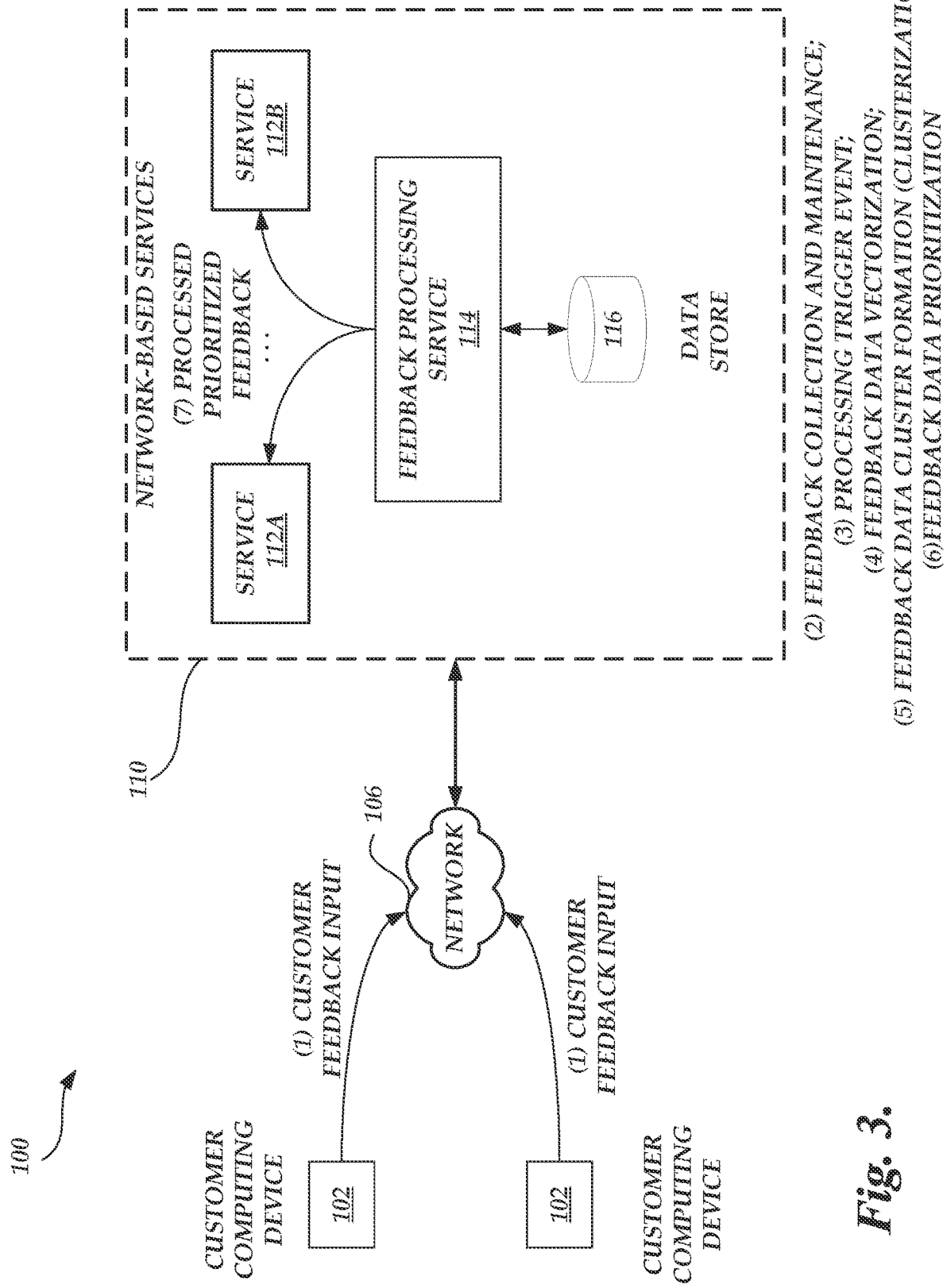
FIG. 3 is a block diagram of the system of FIG. 1 illustrating various interactions of the components related to aggregating and prioritizing customer feedback in accordance with aspects of the present application.

Turning now to FIG. 3, illustrative interactions of the components of the system 100 will be described. For purposes of the illustration, it can be assumed that the network-based 110 has been configured in a manner to process feedback associated with a plurality of services 112Illustriatvely, the feedback may be provided by one or more customers/users that access or other interface with one or more services 112 Additionally, it can be assumed that the users have access to registrations, credentials or necessary permissions to access the policy management service 114.

At (1), the network-based 110 can receive customer inputs from a plurality of customers. Illustratively, the customer inputs correspond to one or more individual submissions of customer feedback that can be utilized to identify at least one feedback to be implemented in a network service. Illustratively, customers can provide customer feedback in various forms, including a text including identified services, service types, or action items such as support cases, reviews, comments, suggestions, and so on. As described above, the various feedback forms are merely examples, and the present application is not limited thereto, and the feedback forms can be based on a particular application. In other embodiments, the customer input can also explicitly exclude some information, such as excluding any specific service or service type or any experience regarding the service. By way of example, in some embodiments, the customer may access a user interface, such as a graphical user interface generated on a customer computing device 102 to provide the customer input. The customer input may be provided by manipulation of the interface to select from pre-existing categories or types of service or product inputs that can include a definition of the service or product. The customer input also may be provided by manipulation of the interface to select labels from pre-existing categories or types of service or product inputs. In other embodiments, the feedback is unstructured in which a customer can provide inputs (e.g., text or audible commands) that indicate the desired feedback. Examples of such inputs can include, but are not limited to, "loved the new calculated total size!" or "please let me sort by date modified" or "why can't I scroll sideways on my mac specifically in the new console," etc. As will be described below, aspects of the present application will facilitate the aggregation and prioritization of the customer feedback.

At (2), the feedback processing service 114 can obtain customer feedback. In some embodiments, the feedback processing service 114 can parse the unstructured customer inputs to identify customer feedback. Illustratively, the feedback processing service 114 can parse the customer inputs to identify keywords or identifiers that correspond to at least one of an identified network service, network products, network console, network service type, action type, or other information. The feedback processing service 114 can utilize additional inputs, such as customer profile information, to facilitate processing the customer inputs. For example, the feedback processing service 114 can utilize default information that may facilitate network service or product identification. In other embodiments, the feedback processing service 114 can utilize historical customer input processing results as suggestions for parsing and processing the current customer input (e.g., understanding semantics as to how the customer has previously phrased the network service or product in the customer's feedback). In some embodiments, the feedback processing service 114 can leverage additional services, such as natural language processing services, machine-learned algorithms, and the like to parse and process the customer input. In some embodiments, the feedback management service 144 can remove customer input related to the customer's privacy or confidentiality.

At (3), the feedback processing service 114 can detect a triggering event that initiates aggregate and prioritize the obtained customer feedback. In some embodiments, the feedback processing service 114 can periodically aggregate and prioritize customer inputs. The feedback processing service 114 can sequentially prioritize the aggregated customer inputs, such as performing prioritization after aggregation. In some embodiment, the feedback processing service 114 aggregate and prioritize the customer inputs based on the number of newly obtained customer feedback. The triggering event can be determined based on the applications.

At (4), the feedback processing service 114 can aggregate semantically similar customer feedback. In some embodiments, the feedback processing service 114 can aggregate semantically similar feedback by clustering the customer feedback. As a result of the aggregation, multiple clusters that include aggregated semantically similar feedback can be created in these embodiments. Further, in the embodiments, the customer feedback can be vectorized, generating an individual numerical vector for the individual customer feedback. The vectorized cluster can be represented as a graph model, such as a centroid of a cluster. The feedback processing service 114 can aggregate the vectorized customer feedback by comparing each customer input's numerical vector. In some embodiments, the feedback processing service 114 can vectorize and aggregate the semantically similar feedbacks using k-means clustering.

In one embodiment, the feedback may be vectorized using embedding techniques such as a Sentence-BERT ("SBERT"). The aggregation can be based on a k-means clustering. For example, the k-means clustering partitions n observations into k clusters based on the nearest cluster centroid. Cluster centroids are iteratively updated based on new cluster assignments of the feedback. In another embodiment, the feedback processing service 114 may cluster the semantically similar feedback using a DNN-based clustering such as Deep Embedded Clustering ("DEC"). For example, if the number of customer inputs is n which are to be clustered into k clusters, the DEC transforms the customer inputs into a latent feature space Z using a deep autoencoder and compute a soft assignment between the space Z and cluster centroids by measuring similarity between the space Z and the cluster centroids. The cluster centroids and the autoencoder parameters are then updated. In one embodiment, the feedback processing service 114 can aggregate semantically similar feedbacks based on each feedback's attribute, such as an attribute clustering.

At (5), the feedback processing service 114 can determine a representative theme of each of the clusters. In some embodiments, the feedback processing service 114 can identify the representative theme by identifying representative vectorized customer inputs of each of the cluster. In the embodiments, the feedback processing service 114 can determine the representative theme using each cluster's centroid. Illustratively, the feedback processing service 114 can extract nouns, proper nouns, and noun phrases of one or more representative feedbacks from a cluster. Then, the feedback processing service 114 can remove all pronouns that occur at the beginning or end of noun phrases. In one embodiment, dependency parsing can extract all verbs that are nominal subject or object of the nouns, proper nouns, and noun phrases. In another embodiment, each representative feedback can be constructed in the form of <verb, noun>. In this aspect, the form can be a candidate themes for a cluster.

At (6), the feedback processing service 114 can prioritize each of the clusters. In some embodiments, the feedback processing service 114 can measure at least one following criteria; an inertia score of each cluster, a number of customers of each cluster, or a number of received customer feedbacks of each cluster. Other criteria to rank the remaining clusters may include (1) size of the customer (by revenue) (e.g., an attribute revenue amount per individual customer or a potential revenue/project opportunity per individual customer), (2) age of the customer (e.g., a characterized time comparable to other customers), (3) time interval between the feedback items (several customer feedback in a week can be ranked higher than the same number of customer feedback over a longer period of time). In these embodiments, two or more criteria can be combined to rank the remaining clusters. For example, if two or more clusters have the same number of feedback from the same number of customers, the clusters having feedback from customers of larger sizes will be ranked higher. In the example, the cluster having feedback in a shorter time interval (e.g., in a day) can also have a higher ranking than other clusters having feedback in a longer interval (e.g., over a year). Illustratively, the feedback processing service 114 can filter the clusters based on each cluster's customer inputs or based on at least one of the criteria. In some embodiments, the feedback processing service 114 can filter the clusters. Each cluster that does not have a minimal vectorized customer input threshold can be filtered. For example, a cluster that does not have 10 feedbacks proximity to the centroid of the cluster can be filtered. In another example, a cluster that does not meet a threshold of one or more of the criteria can be filtered. In one aspect, the feedback processing service can measure at least one of the inertia scores, the number of customers, or the number of feedbacks from each cluster. The inertia score can represent the coherence of each cluster. In one aspect, the feedback processing service can rank each of the clusters in ascending order of the inertia score. In another aspect, the feedback processing service can measure at least two of the criteria and rank the clusters by combining the measured criteria. These criteria are merely examples, and the present disclosure is not limited thereto, and the criteria can be determined based on a particular application.

Thereafter, at (7), the feedback processing service 114 can cause the implementation of the prioritized clusters, including prioritized customer feedback. Furthermore, the feedback processing service 114 can confirm or notify the user that the prioritized customer feedback is generated. For example, the feedback processing service 114 can provide templates or other information that the user can utilize for future implementations. Similarly, the feedback processing service 114 can store the correlated prioritized feedback inputs with the corresponding network-based services or products.

Figure 4:
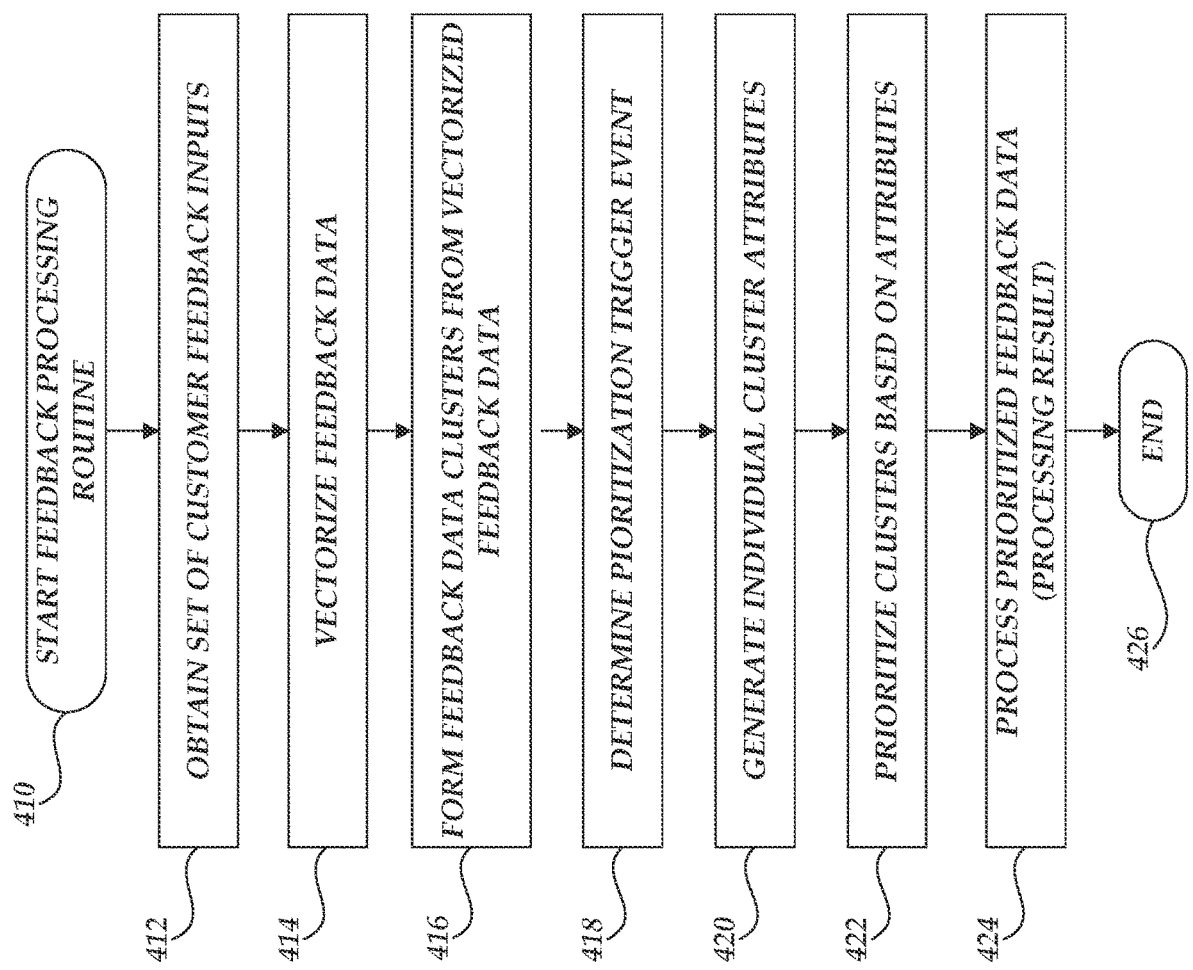
FIG. 4 is a flow diagram depicting an example routine for aggregating and prioritizing customer feedback in accordance with aspects of the present application.

Turning now to FIG. 4, a routine 400 for customer input aggregation and prioritization by a feedback processing service 114 will be described. Routine 400 is illustratively implemented by the feedback management service 114. As previously described, it can be assumed that a network-based 110 has been configured in a manner to implement a plurality of feedback services 112 on behalf of users. Additionally, it can be assumed that the user has access to registrations, credentials, or necessary permissions to access the feedback management service 114.

At block 412, the feedback processing service 114 can obtain the customer inputs. Illustratively, the customer inputs correspond to customer feedbacks context that can be utilized to identify at least one feedback to be implemented in a network service. Customers can provide the customer inputs in various forms, including text including identified services, service types, or action items such as reviews, comments, suggestions, customer support cases, and so on. In other embodiments, the customer input can also explicitly exclude some information, such as excluding any specific service or service type or any experience regarding the service. By way of example, in some embodiments, the customer may access a user interface, such as a graphical user interface generated on a customer computing device 102 to provide the customer input. The customer input may be provided by manipulation of the interface to select from pre-existing categories or types of service or product inputs that can include a definition of the service or product. The customer input may also be provided by manipulating the interface to select labels from pre-existing categories or types of service or product inputs. In other embodiments, the feedback is unstructured in which a customer can provide inputs (e.g., text or audible commands) that indicate the desired feedback. Examples of such inputs can include, but are not limited to, "loved the new calculated total size!" or "please let me sort by date modified" or "why can't I scroll sideways on my mac specifically in the new console," etc. As will be described below, aspects of the present application will facilitate the aggregation and prioritization of customer feedback. In some embodiments, the feedback processing service 114 can parse the unstructured customer inputs to identify customer feedback. Illustratively, the feedback processing service 114 can parse the customer inputs to identify keywords or identifiers that correspond to at least one of an identified network service, network products, network console, network service type, action type, or other information. The feedback processing service 114 can utilize additional inputs, such as customer profile information, to facilitate processing the customer inputs. For example, the feedback processing service 114 can utilize default information that may facilitate network service or product identification. In other embodiments, the feedback processing service 114 can utilize historical customer input processing results as suggestions for parsing and processing the current customer input (e.g., understanding semantics as to how the customer has previously phrased the network service or product in the customer's feedback). In some embodiments, the feedback processing service 114 can leverage additional services, such as natural language processing services, machine-learned algorithms, and the like to parse and process the customer input. In some embodiments, the feedback management service 144 can remove customer input related to the customer's privacy or confidentiality.

At block 414, the feedback processing service 114 can detect a triggering event that aggregates and prioritizes the obtained customer feedback. In some embodiments, the feedback processing service 114 can periodically aggregate and prioritize customer inputs. In one embodiment, the feedback processing service 114 can sequentially prioritize the aggregated customer inputs, such as performing prioritization after aggregation. In some embodiments, the feedback processing service 114 can aggregate and prioritize the customer inputs based on the number of newly obtained customer feedback. The triggering event can be determined based on the specific applications.

At block 416, the feedback processing service 114 can vectorize the set of customer feedback. In the embodiments, the customer feedback can be vectorized, generating an individual numerical vector for the individual customer inputs. The vectorized cluster can be represented as a graph model, such as a centroid of a cluster.

At block 418, the feedback processing service 114 can cluster the customer feedback by aggregating semantically similar customer feedback. In some embodiments, the feedback processing service 114 can aggregate semantically similar feedbacks to form clusters. The feedback processing service 114 can aggregate the vectorized customer inputs by comparing each customer feedback's numerical vector.

Further at block 418, in some embodiments, the feedback may be vectorized using embedding techniques such as a Sentence-BERT ("SBERT"). The aggregation can be based on k-means clustering. For example, the k-means clustering partitions of n observations can be aggregated into k clusters based on the nearest cluster centroid. Cluster centroids are iteratively updated based on new cluster assignments of the feedback. In another embodiment, the feedback processing service 114 may cluster the semantically similar feedback using a DNN-based clustering such as Deep Embedded Clustering ("DEC"). For example, suppose the number of customer inputs is n which are to be clustered into k clusters. In that case, the DEC transforms the customer inputs into a latent feature space Z using a deep autoencoder and computes a soft assignment between the space Z and cluster centroids by measuring a similarity between the space Z and the cluster centroids. The cluster centroids and the autoencoder parameters are then updated. In one embodiment, the feedback processing service 114 can aggregate semantically similar feedbacks based on each feedback's attribute, such as attribute clustering.

At block 420, the feedback processing service 114 can identify a representative theme of each cluster. In some embodiments, the feedback processing service 114 can identify the representative theme by identifying representative vectorized customer feedback of each of the clusters. In the embodiments, the feedback processing service 114 can determine the representative theme using each cluster's centroid. Illustratively, the feedback processing service 114 can extract nouns, proper nouns, and noun phrases of one or more representative feedbacks from a cluster. The feedback management service 114, then, can remove all pronouns that occur at the beginning or end of noun phrases. In one embodiment, dependency parsing can extract all verbs that are nominal subject or object of the nouns, proper nouns, and noun phrases. In another embodiment, each of the representative feedbacks can be constructed in the form of <verb, noun>. In this aspect, the form can be a candidate themes for a cluster.

At block 422, the feedback processing service 114 can filter the clusters. Illustratively, the feedback processing service can filter the clusters based on each cluster's customer feedback. Each of the clusters that do not have a minimal vectorized customer input threshold can be filtered out. For example, a cluster that does not have 10 feedbacks proximity to the centroid of the cluster can be filtered out.

At block 424, the feedback processing service 114 can prioritize the individual cluster. In some embodiments, the feedback processing service 114 can measure at least one of the following criteria: an inertia score of each cluster, a number of customers of each cluster, or a number of received customer feedbacks of each cluster. In one embodiment, the criteria can be a weighted number of customers, where the weight can be based on a customer size, age, etc. In another embodiment, the criteria can be based on how closely related the customer feedbacks over a time period. In these embodiments, two or more criteria can be combined to rank the remaining clusters. In some embodiments, the feedback processing service 114 can measure at least one of the inertia scores, the number of customers, or the number of feedbacks of each cluster. The inertia score can represent the coherence of each cluster. In one aspect, the feedback processing service can rank each cluster in ascending order of the inertia score. In another aspect, the feedback processing service can measure at least two of the criteria and rank the clusters by combining the measured criteria.

At block 426, the feedback processing service 114 can cause the implementation of the prioritized clusters, including prioritized customer feedback. In addition, the feedback processing service 114 can provide confirmation or notifications to the user that the prioritized customer feedback is generated. For example, the feedback processing service 114 can provide templates or other information that the user can utilize for future implementations. Similarly, the feedback processing service 114 can store the correlated prioritized feedback inputs with the corresponding network-based services or products.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for prioritizing customers' feedback in network-based services, the system comprising
one or more computing devices associated with a processor and a memory for executing computer-executable instructions to implement a feedback management service, wherein the feedback management service is configured to:
obtain a set of customer inputs as customer feedback related to one or more network services hosted on behalf of network service providers;
vectorize the set of customer inputs to form a set of vectorized customer inputs, wherein vectorizing the set of customer inputs includes generating an individual numerical vector for individual customer inputs from the set of customer inputs; in the control policy input includes a specification of a network service type associated with the plurality of network services;
cluster the set of vectorized customer inputs, wherein clustering the set of vectorized inputs includes:
aggregate semantically similar vectorized customer inputs based on comparison of the numerical vectors; and
for individual clusters, identify a representative vectorized customer input based on a centroid of the individual cluster;
for the individual cluster, filter any cluster not exceeding a minimal vectorized customer input threshold to form a set of filtered clusters;
for the filtered clusters, prioritize the individual cluster, wherein the prioritization comprising;
measuring a ranking criteria; and
ranking the cluster based on the measured criteria; and
generate a processing result based on the prioritized, filtered clusters.

2. The system as recited in claim 1, wherein the set of customer inputs includes textual inputs characterized as customer feedback.

3. The system as recited in claim 1, wherein the feedback processing service parses the set of customer inputs to identify keywords corresponding to at least one of the one or more network service.

4. The system as recited in claim 1, wherein the feedback processing service is further configured to detect a triggering event, wherein the triggering event initiates the feedback management service to cluster the set of vectorized customer inputs.

5. The system as recited in claim 4, wherein the triggering event is set periodically.

6. The system as recited in claim 4, wherein the triggering event is based on a number of newly obtained customer inputs.

7. The system as recited in claim 1, wherein the feedback processing service aggregates semantically similar vectorized customer inputs using k-means clustering, wherein the k-means clustering can use a sentence-bert ("SBERT") technique for the vectorization.

8. The system as recited in claim 1, wherein the feedback management service aggregates semantically similar vectorized customer inputs using a deep embedded clustering ("DEC").

9. The system as recited in claim 1, wherein the ranking criteria is an inertia score, wherein the inertia score is a coherence of each of the cluster.

10. The system as recited in claim 1, wherein the ranking criteria is a number of customers of each cluster.

11. The system as recited in claim 1, wherein the ranking criteria is a number of feedbacks of each cluster.

12. The system as recited in claims 1, wherein the ranking criteria is a combination of an inertia score, a number of customers, or a number of feedbacks of each cluster.

13. The system as recited in claim 1, wherein the processing results corresponds to one or more cluster attributes, wherein individual cluster attributes include a theme of the individual cluster.

14. The system as recited in claim 1, wherein the feedback processing service can extract nouns, proper nouns, and noun phrases of one or more representative feedbacks from a cluster to identify the representative vectorized customer input.

15. A method for managing network-based feedback processing service comprising:
vectorizing a set of customer input associated with a network service to identify customer feedbacks for a plurality of network services hosted on behalf of network service providers;
clustering the set of vectorized customer inputs, wherein clustering the set of vectorized customer inputs comprise:
aggregating semantically similar vectorized customer inputs based on comparison of the numerical vectors; and
for individual clusters, identifying a representative vectorized customer input based on a centroid of the individual cluster;
prioritizing the individual clusters, wherein the prioritization comprises:
measuring a ranking criteria; and
ranking the cluster based on the measured criteria; and
generating a processing result based on the prioritized clusters.

16. The method as recited in claim 15, further comprising obtaining the set of customer inputs as customer feedback related to a plurality of network services.

17. The method as recited in claim 16, wherein obtaining the set of customer inputs include textual inputs characterized as customer feedback.

18. The method as recited in claim 15 further comprising detecting a triggering event, wherein the triggering event initiates clustering the set of vectorized customer inputs.

19. The method as recited in claim 15, wherein the aggregation uses k-means clustering, wherein the k-means clustering can use a sentence-bert ("SBERT") technique for the vectorization.

20. The method as recited in claim 15, wherein the aggregation uses a deep embedded clustering ("DEC").

21. The method as recited in claim 15, wherein the ranking criteria is an inertia score, wherein the inertia score is a coherence of each of the cluster.

22. The method as recited in claim 15, wherein the ranking criteria is a number of customers of each cluster.

23. The method as recited in claim 15, wherein the ranking criteria corresponds to one or more attributes associated with customers.

24. The method as recited in claim 15, wherein the one or more attributes corresponds to age of an individual customer.

25. The method as recited in claim 24, wherein the one or more attributes corresponds to a characterized size of an individual customer.

26. The method as recited in claim 25, wherein the characterized size corresponds to at least one of an attributed revenue of the individual customer or potential opportunity with the individual customer. The method as recited in claim 15, wherein the ranking criteria is a combination of two or more criterion.

27. The method as recited in claim 15, wherein the ranking criteria is a weighted combination of two or more criterion.

28. The method as recited in claim 15, wherein generating a processing result based on the prioritized clusters includes generating each cluster's attributes, wherein the attribute is a theme of the individual cluster.

29. A method for managing network-based feedback processing service comprising:
 obtaining a set of customer inputs as customer feedback related to one or more network services hosted on behalf of network service providers, wherein the set of customer inputs includes textual inputs characterized as customer feedback;
 vectorizing the set of customer inputs to form a set of vectorized customer inputs, wherein vectorizing the set of customer inputs includes generating an individual numerical vector for individual customer inputs from the set of customer inputs; in the control policy input includes a specification of a network service type associated with the plurality of network services;
 clustering the set of vectorized customer inputs, wherein clustering the set of vectorized customer inputs comprise:
  aggregating semantically similar vectorized customer inputs based on comparison of the numerical vectors, wherein the aggregation uses k-means clustering, wherein the k-means clustering can use a sentence-bert ("SBERT") technique; and
  for individual clusters, identifying a representative vectorized customer input based on a centroid of the individual cluster;
 for the individual cluster, filter any cluster not exceeding a minimal vectorized customer input threshold to form a set of filtered clusters;
 for the filtered clusters, prioritize the individual cluster, wherein the prioritization comprises:
  measuring an inertia score of each of the clusters, wherein the inertia score represents a coherence of each of the clusters.; and
  ranking the cluster in ascending order of the inertia score; and
 generating processing results based on the prioritized clusters.

30. The method of claim 29 further comprises parsing the set of customer inputs to identify keywords corresponding to at least one of the one or more network services.

31. The method as recited in claim 29, wherein the aggregation uses a deep embedded clustering ("DEC").

32. The method as recited in claim 29, further comprising generating each cluster's attributes, wherein the attribute is a theme of the individual cluster.

33. The method as recited in claim 29, further comprising causing implementation of the processing results of the prioritized clusters, including prioritized customer feedbacks to be implemented by the identified network service.

* * * * *

UNITED STATES PATENT AND TRADEMARK OFFICE
CERTIFICATE OF CORRECTION

PATENT NO. : 11,689,432 B1
APPLICATION NO. : 17/657437
DATED : June 27, 2023
INVENTOR(S) : Kasturi Bhattacharjee It is certified that error appears in the above-identified patent and that said Letters Patent is hereby corrected as shown below:

In the Specification

Column 5, Line 55, delete "202may" and insert -- 202 may --.

Column 6, Lines 28-29, delete "112Illustriatvely," and insert -- 112 Illustratively, --.

In the Claims

Column 16, Line 19, in Claim 29, delete "clusters.; " and insert -- clusters; --.

Signed and Sealed this
Fifth Day of September, 2023

*Katherine Kelly Vidal*
Katherine Kelly Vidal
*Director of the United States Patent and Trademark Office*